(12) United States Patent
Faltýnek et al.

(10) Patent No.: US 11,797,753 B2
(45) Date of Patent: Oct. 24, 2023

(54) SYSTEM AND METHOD FOR ADAPTING TEXT-BASED DATA STRUCTURES TO TEXT SAMPLES

(71) Applicant: Univerzita Palackého v Olomouci, Olomouc (CZ)

(72) Inventors: Dan Faltýnek, Olomouc (CZ); Martina Benešová, Jihlava (CZ); Vladimír Matlach, Olomouc (CZ); Ondřej Kučera, Tovéř (CZ)

(73) Assignee: UNIVERZITA PALACKÉHO V OLOMOUCI, Olomouc (CZ)

( * ) Notice: Subject to any disclaimer, the term of this patent is extended or adjusted under 35 U.S.C. 154(b) by 0 days.

(21) Appl. No.: 17/809,130

(22) Filed: Jun. 27, 2022

(65) Prior Publication Data

US 2023/0080789 A1    Mar. 16, 2023

(51) Int. Cl.
*G06F 40/166* (2020.01)
*G06F 40/30* (2020.01)
*G06F 40/279* (2020.01)

(52) U.S. Cl.
CPC .......... *G06F 40/166* (2020.01); *G06F 40/279* (2020.01); *G06F 40/30* (2020.01)

(58) Field of Classification Search
CPC ...... G06F 40/166; G06F 40/279; G06F 40/30; G06F 40/284; G06F 18/22; G06F 16/313; G10L 25/63
See application file for complete search history.

(56) References Cited

U.S. PATENT DOCUMENTS

| | | | |
|---|---|---|---|
| 2009/0138356 A1* | 5/2009 | Pomplun | G06Q 30/02 705/14.69 |
| 2011/0131485 A1* | 6/2011 | Bao | G06Q 30/0251 715/243 |
| 2013/0246447 A1* | 9/2013 | Wickramasuriya | H04N 21/4668 707/E17.014 |
| 2014/0222736 A1* | 8/2014 | Drew | G06F 9/5066 706/12 |
| 2019/0027142 A1* | 1/2019 | Iwanami | G10L 15/1815 |
| 2022/0318520 A1* | 10/2022 | Pouran Ben Veyseh | G06F 18/22 |
| 2022/0414714 A1* | 12/2022 | Maher | G06Q 30/0276 |

* cited by examiner

*Primary Examiner* — Wilson W Tsui
(74) *Attorney, Agent, or Firm* — M&B IP Analysts, LLC (57) ABSTRACT

Techniques for customizing multimedia content using data structures adapted to text samples. A method includes dividing a text sample into segments. Unique words are identified within the segments. For each unique word found in the segments, its neighboring words are identified. Based on sentiment values associated with those neighboring words, a sentiment of each unique is determined. Using the sentiments of the unique words, text skeletons are modified by inserting the unique words into corresponding locations within structured data of the text skeletons. The modified text skeletons may be inserted into multimedia content in order to customize that multimedia content to the text sample.

19 Claims, 4 Drawing Sheets

SYSTEM AND METHOD FOR ADAPTING TEXT-BASED DATA STRUCTURES TO TEXT SAMPLES

TECHNICAL FIELD

The present disclosure relates generally to text-based data processing, and more specifically to adapting text-based data structures to text samples.

BACKGROUND

Customization of multimedia content is used in a wide variety of fields. In particular, customizing multimedia content may be useful for targeted digital advertising. Some existing solutions utilize known or learned demographic profiles of users in order to customize multimedia content with predetermined text associated with those demographic profiles. These solutions therefore customize media contents to broad groups of users, not individual users. Other solutions utilize text produced by users in order to select appropriate advertisements to provide to those users. None of these existing solutions succeed in providing multimedia content that is truly customized to a given user.

It would therefore be advantageous to provide a solution for customizing multimedia content that overcomes the deficiencies noted above. It would further be advantageous to provide techniques that allow for more accurately and efficiently customizing multimedia content using textual content.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for customizing multimedia content using text-based data structures adapted to text samples. The method comprises: dividing a text sample into a plurality of segments, each segment including a plurality of words, wherein an amount of words included in each of the plurality of segments has a maximum deviation of 10% from an amount of words included in each other segment of the plurality of segments; identifying a unique word in the plurality of segments, wherein the unique word is a word occurring exactly once in each of at least two segments of the plurality of segments; identifying a plurality of neighboring words within at least one vicinity of the unique word, wherein each vicinity of the unique word is a set of words within a threshold distance of the unique word in one of the plurality of segments; determining a first sentiment of the unique word based on the plurality of neighboring words identified for the unique word; modifying a text skeleton based on the determined first sentiment, wherein the text skeleton is a structured dataset including a location having a designated second sentiment, wherein modifying the text skeleton further comprises inserting the unique word into the location in the structured dataset, wherein the first sentiment determined for the unique word matches the second sentiment designated for the location in the structured dataset; and inserting the modified text skeleton into a multimedia content item in order to create a customized multimedia content item for the text sample.

Certain embodiments disclosed herein also include a non-transitory computer readable medium having stored thereon causing a processing circuitry to execute a process, the process comprising: dividing a text sample into a plurality of segments, each segment including a plurality of words, wherein an amount of words included in each of the plurality of segments has a maximum deviation of 10% from an amount of words included in each other segment of the plurality of segments; identifying a unique word in the plurality of segments, wherein the unique word is a word occurring exactly once in each of at least two segments of the plurality of segments; identifying a plurality of neighboring words within at least one vicinity of the unique word, wherein each vicinity of the unique word is a set of words within a threshold distance of the unique word in one of the plurality of segments; determining a first sentiment of the unique word based on the plurality of neighboring words identified for the unique word; modifying a text skeleton based on the determined first sentiment, wherein the text skeleton is a structured dataset including a location having a designated second sentiment, wherein modifying the text skeleton further comprises inserting the unique word into the location in the structured dataset, wherein the first sentiment determined for the unique word matches the second sentiment designated for the location in the structured dataset; and inserting the modified text skeleton into a multimedia content item in order to create a customized multimedia content item for the text sample.

Certain embodiments disclosed herein also include a system for customizing multimedia content using text-based data structures adapted to text samples. The system comprises: a processing circuitry; and a memory, the memory containing instructions that, when executed by the processing circuitry, configure the system to: divide a text sample into a plurality of segments, each segment including a plurality of words, wherein an amount of words included in each of the plurality of segments has a maximum deviation of 10% from an amount of words included in each other segment of the plurality of segments; identify a unique word in the plurality of segments, wherein the unique word is a word occurring exactly once in each of at least two segments of the plurality of segments; identify a plurality of neighboring words within at least one vicinity of the unique word, wherein each vicinity of the unique word is a set of words within a threshold distance of the unique word in one of the plurality of segments; determine a first sentiment of the unique word based on the plurality of neighboring words identified for the unique word; modify a text skeleton based on the determined first sentiment, wherein the text skeleton is a structured dataset including a location having a designated second sentiment, wherein the system is further configured to insert the unique word into the location in the structured dataset, wherein the first sentiment determined for the unique word matches the second sentiment designated for the location in the structured dataset; and insert the modified text skeleton into a multimedia content item in order to create a customized multimedia content item for the text sample.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include techniques for customizing multimedia content to text samples as well as techniques for adapting text-based data structures in the form of text skeletons to text samples from users. In an embodiment, a text sample is divided into multiple segments having approximately the same amount of words. A unique word which occurs exactly once in at least two of the segments is identified. Neighboring words within a threshold distance of the unique word in the segments are identified and used to determine a sentiment of the unique word.

A text skeleton is modified based on the sentiment determined for the unique word. The text skeleton is a structured data set having one or more locations designated for inserting words of a given sentiment. The unique word is inserted into locations within the text skeleton having designated sentiments matching the sentiment determined for the unique word, for example by inserting the unique word into a blank space or replacing a word expressing the sentiment in the text skeleton with the unique word. In various embodiments, the modified text skeleton is inserted into multimedia content, thereby creating customized multimedia content for the text sample that is customized to the text sample.

The disclosed embodiments allow for customizing multimedia content to text samples in a manner which provides meaningful customization. More specifically, the disclosed embodiments include techniques for identifying words which are unique within the text sample and using the unique words in order to customize the multimedia content in a manner that is meaningful to an author of the text sample. The disclosed embodiments may be utilized to identify a single unique word that accurately captures a sentiment of the text sample, thereby allowing for adapting the text skeleton (and therefore customizing the multimedia content) without requiring additional sentiments or other notable words, thereby reducing additional processing needed to effectively customize the multimedia content for a given text sample.

Additionally, the disclosed embodiments utilize text segments of approximately the same length (i.e., segments having approximately the same number of words) in order to further improve the identification of unique words. In various disclosed embodiments, the number of words in each text segment is within 10% of the number of words in other text segments. In this regard, it has been identified that words having particular meaning within a text segment can be identified optimally using segments having amounts of words within 10% of each other. More specifically, using a 10% threshold allows for maximizing accuracy of identifying unique words while minimizing the number of samples that must be analyzed in order to yield a meaningful measure of uniqueness. Thus, the disclosed embodiments provide improved techniques for processing the data of the text segments.

It should also be noted that manual processes for customizing multimedia content for users based on samples of information from those users exist, but that these manual processes rely on a subjective analysis of an overall sentiment of the user or otherwise subjectively looking for common themes or patterns in text authored by the user. Moreover, the customization of multimedia content using these subjectively identified sentiments introduces a further layer of subjectivity in the manner by which the multimedia content is customized. The result is that the customized multimedia content can vary widely depending on the human customizer who evaluated the text sample such that different human customizers will typically customize the multimedia content differently even when basing the customization on the same text sample.

The disclosed embodiments, which provide new processes using objective criteria for breaking text samples into segments and identifying unique words within those segments, provide an objective process which allow for producing consistent results. The new processes differ from the processes which may be used by humans performing customization at least insofar as the new processes do not rely on any subjective evaluation of aspects of the text sample which seem unique. Moreover, the processes described herein are capable of being encoded and implemented on computers, as opposed to the existing processes which rely on human knowledge, thereby enabling new computer functionality with respect to customizing multimedia content based on text samples.

Figure 1:
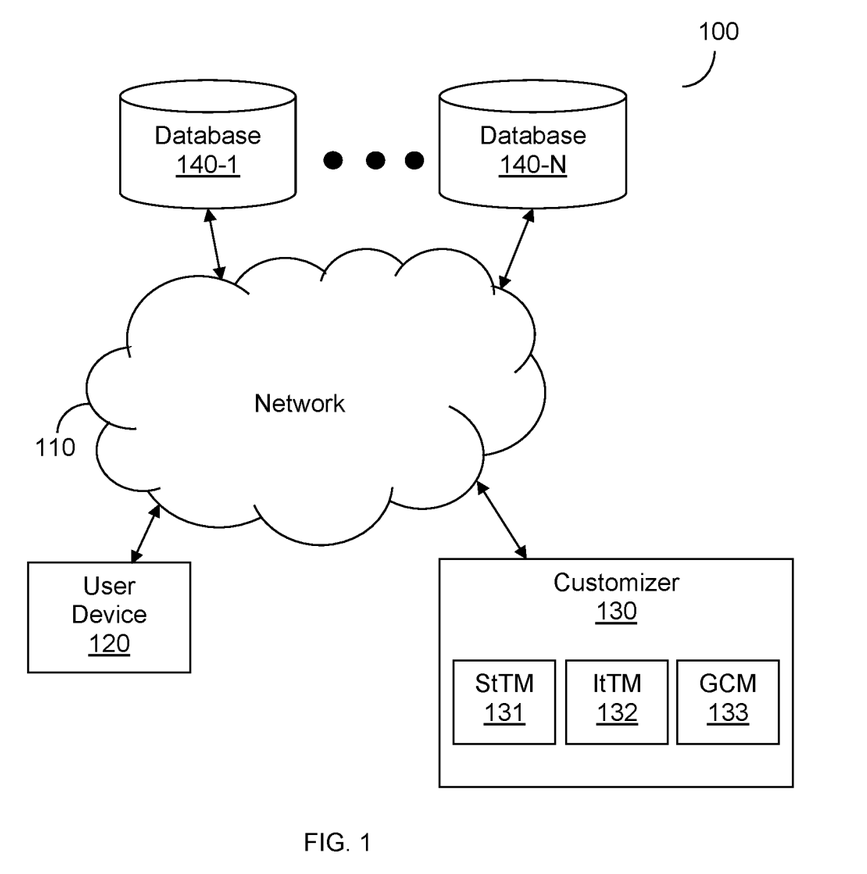
FIG. 1 is a network diagram utilized to describe various disclosed embodiments.

FIG. 1 shows an example network diagram 100 utilized to describe the various disclosed embodiments. In the example network diagram 100, a user device 120, a customizer 130, and a plurality of databases 140-1 through 140-N (hereinafter referred to individually as a database 140 and collectively as databases 140, merely for simplicity purposes) communicate via a network 110. The network 110 may be, but is not limited to, a wireless, cellular or wired network, a local area network (LAN), a wide area network (WAN), a metro area network (MAN), the Internet, the worldwide web (WWW), similar networks, and any combination thereof.

The user device (UD) 120 may be, but is not limited to, a personal computer, a laptop, a tablet computer, a smartphone, a wearable computing device, or any other device capable of receiving user inputs and sending text samples, for example to the customizer 130 or to the databases 140. In accordance with various disclosed embodiments, a text sample of a user of the user device 120 is provided for analysis and utilized to customize multimedia content by the customizer 130. To aid in obtaining the text samples for customization, the customizer 130 may further include modules 131 through 133 used for preprocessing source data in order to create the text samples for analysis.

The customizer 130 is configured to adapt text-based data structures, to customize multimedia content, or both, in accordance with one or more embodiments described herein. To this end, the customizer 130 is configured to obtain a text sample of a user, for example by receiving such a sample from the user device 120 or by retrieving the text sample from one of the databases 140. The customizer 130 may further be configured to provide adapted text structures or customized multimedia content to the user device 120, thereby allowing the user device 120 to customize multimedia content or to display the previously customized multimedia content, respectively. As a non-limiting example, the customized multimedia content may be projected as a digital advertisement via the user device 120. To this end, the customizer 130 may have stored therein text skeletons, multimedia content, or both. Alternatively or additionally, the customizer 130 may retrieve such text skeletons from the databases 140.

In accordance with various disclosed embodiments, the customizer 130 is configured to determine one or more criteria used for evaluation of the unique word such as, but not limited to, vicinities, contexts, and/or sentiments of the unique word. To this end, the customizer 130 may be configured to identify vicinities and to analyze sentiments within occurrences of a unique word in order to define a psychometric profile of the user to aid in customization. To this end, the customizer 130 is configured to identify unique words, to identify neighboring words for instances of the unique words, and to determine sentiments for the unique words as described herein. A complete set of unique words and their vicinities provides overall psychometrics containing the degrees of sentiment categories. In a further embodiment, the customizer 130 is further configured to identify topics which may be reflective of potentially sensitive topics for a user. To this end, the customizer 130 is configured to identify portions of text samples which are more densely populated with topics, for example, which include topical words or groups of topical words that each occur within multiple vicinities of the unique word.

The databases 140 may store text skeletons to be adapted as described herein, and may further store text samples of users, multimedia content to be customized using adapted text skeletons, or both.

Figure 2:
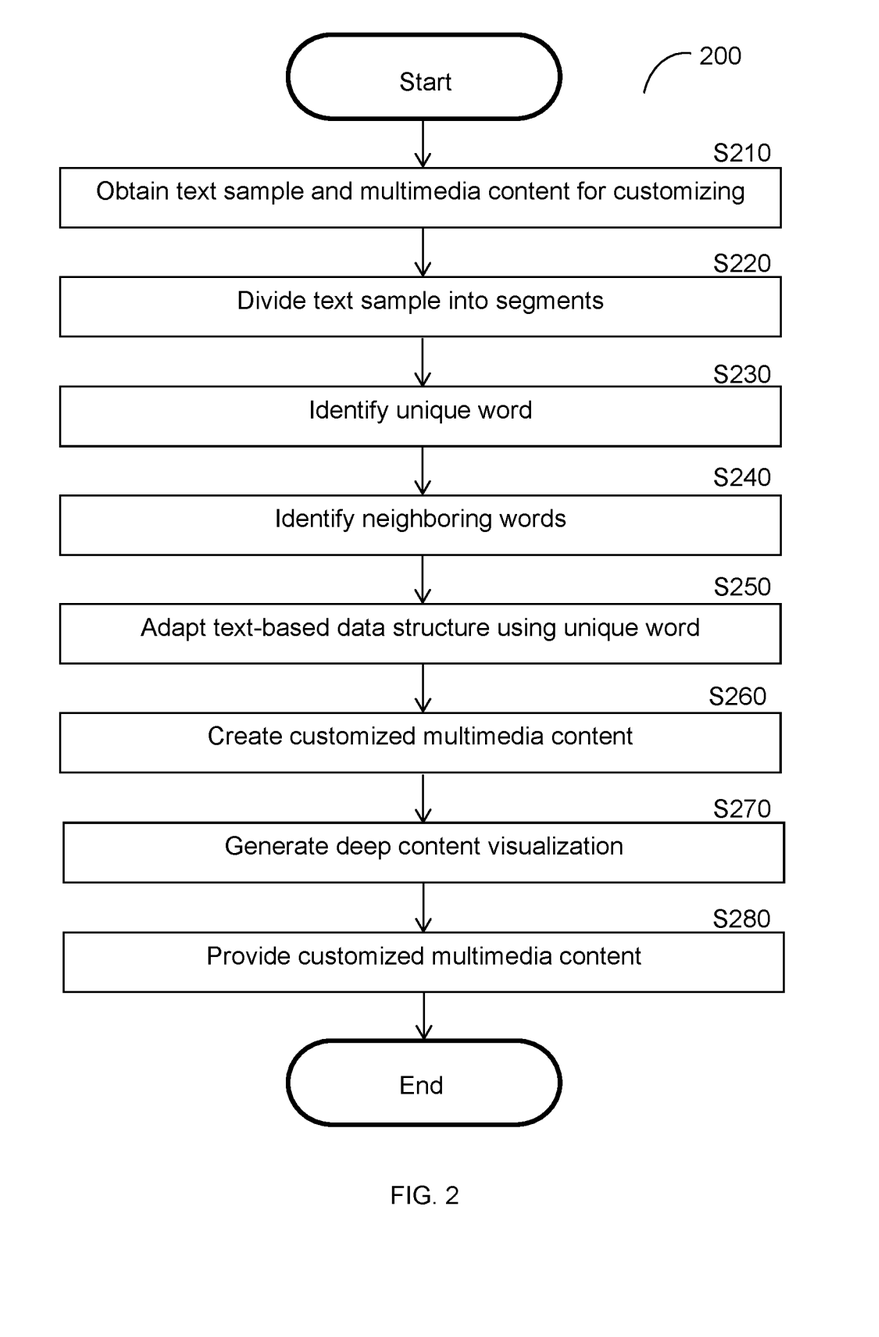
FIG. 2 is a flowchart illustrating a method for customizing a multimedia content item based on a text sample according to an embodiment.

FIG. 2 is a flowchart 200 illustrating a method for customizing a multimedia content item based on a text sample according to an embodiment. In an embodiment, the method is performed by the customizer 130, FIG. 1.

At S210, a text sample to be used for multimedia content customization as well as multimedia content to be customized are obtained. Each obtained item may be received (e.g., from the user device 120) or may be retrieved (e.g., from one of the databases 140). Alternatively, the text sample may be generated based on audio content, for example using a speech-to-text module (StTM) 131 configured to receive a speech input obtained by the audio input unit and to convert the speech input to a text sample corresponding to the speech input.

The multimedia content to be customized may be or may include one or more multimedia content items such as, but not limited to, multimedia content items to be provided as or inserted into digital advertisements. In some embodiments, the multimedia content to be customized may have one or more predetermined portions predesignated for insertion of an adapted text skeleton such that the multimedia content can be customized by inserting an adapted text skeleton in those portions.

The text sample is a user-generated text sample that is either authored by or is based on an audio sample spoken by an individual. In some implementations, the text sample may be extracted from text or audio content including communications by multiple individuals. In such implementations, the text sample only includes communications by one of the individuals.

To this end, the text sample may be generated based on data such as, but not limited to, a digital communication (e.g., email conversations, chat logs, short message service logs, etc.), personal writing (e.g., social media accounts, comments, blogs, letters, diary, personal notes, writing drafts, or other known forms of personal writings), an audio recording of the user speaking (e.g., a recording of their monologue; a recording of their therapy session with a therapist, psychologist, or other medical specialist; a recording of their conversation with a peer, colleague, friend, partner, or family member; or a publicly available speech), combinations thereof, and the like. When the text sample is generated based on a handwritten sample from the user, S210 may further include applying an image-to-text (ItTM) module 132 configured to convert the handwritten text into a computer-readable text sample. When the text sample is generated based on a speech sample, the speech sample may be captured by a microphone or other recording device and converted into the text sample using a speech-to-text module.

In some embodiments, S210 further includes preprocessing data in order to obtain the text sample such that the obtained text sample is a cleaned text sample which originates from a single person and includes only the features needed for subsequent processing as described herein. Data of an individual may be preprocessed without any distortion or text manipulation in order to preserve the text and the original language behaviors of the user reflected therein. The preprocessing may further include applying a grammar-checking module (GCM) 133 configured to analyze the text sample for grammatical errors and to correct any such grammatical errors using predetermined grammar-checking rules. The preprocessing may further include, but is not limited to, cleaning the text sample by removing redundant characters, symbols, hyperlinks, emoticons, videos, pictures, data formatting characters, white characters, and the like.

In an embodiment, the text sample is extracted from source data (i.e., text data, images of handwritten samples, audio data, etc.) including at least 10,000 words spoken or authored by the user. In a further embodiment, the source data is at least 13,125 words long. In this regard, it is noted that a sample size of at least 10,000 words allows for effectively identifying unique words as described herein. It has further been identified that a threshold of at least 13,125 words yields optimal results. More specifically, using source data including at least 13,125 typically results in about 12,500 words of actual text sample after preprocessing thereof.

In an embodiment, the maximum amount of words for the source data is at most 62,500 words. In another embodiment, the maximum amount of words for the source data is at most 100,000 words. In this regard, it has been identified that samples larger than 62,500 words demonstrate unique words less optimally than samples below 62,500 words. If the source data includes more than the maximum amount of words, S210 may further include cutting portions of the text sample beyond the maximum amount of words.

At S220, the text sample is divided into segments. Each segment is a set of words. In an embodiment, the segments are approximately the same size, i.e., include approximately the same amount of words. In a further embodiment, the segments are approximately the same size such that the segments have a maximum deviation of 10%, i.e., the amount of words in each segment is within 10% of the amount of words in each other segment. In another embodiment, the segments are the same size, i.e., such that they include the same amount of words as each other.

In this regard, it has been identified that using segments of approximately the same size allows for accurately identifying words that are sufficiently unique to provide for effective customization of multimedia content. Moreover, it has been further identified that using segments with amounts of words that are within 10% allows for accurately identifying unique words. Accordingly, in some embodiments, using a maximum deviation of 10% allows for reducing the number of segments which need to be created and processed while still achieving the desirable level of uniqueness, thereby allowing for conserving computing resources as compared to using larger numbers of segments made up of closer to the same number of words.

In an embodiment, the number of words in each segment is between 2,000 and 10,000 words. In this regard, it had been identified that words which are sufficiently unique to accurately customize media content to a given user's text sample occur once every 2,000 to 10,000 words. Accordingly, unique words can be accurately observed by dividing text samples into segments having numbers of words within this range. In a further embodiment, the number of words in each segment is at least 5,000 words. In yet a further embodiment, the number of words in each segment is between 6,000 and 9,000 words. In this regard, it is noted that identifying unique words in segment sizes larger than 5,000 words allows for more optimally identifying unique words than smaller segment sizes, and that identifying unique words in segment sizes between 6,000 and 9,000 words allows for optimally identifying unique words.

In an embodiment, when the length of the text sample to be divided into segments is less than 12,500 words, the text sample is divided into three segments each having less than 4,166 words. This segmentation has been identified to provide optimal identification of unique words for text samples less than 12,500 words.

At S230, one or more unique words (i.e., the hapax legomenon) are identified among the segments. In an embodiment, the unique word is a word which occurs exactly once in multiple segments, i.e., occurs exactly once in two or more of the segments. In some embodiments, the identified unique words may be added to a profile for an individual from which the text sample originated. The profile may be supplemented with topical words and sentiments for each unique word used by the user as discussed further below.

In some embodiments where one or more unique words have been previously identified (for example, in historical text samples for a given user), S230 may include analyzing the text sample to determine if any of the previously determined unique words have been identified therein. In this regard, the disclosed embodiments may be applied to continual recording of a person's speech or other continual capturing of inputs from the user in order to detect new occurrences of that user's unique words in order to provide customized media content for the unique words currently being used by the user. In some embodiments, S230 may further include generating a notification indicating that the unique word was used by the individual and sending the notification, for example, to a device operated by a person in contact with the individual in order to alert that person of the individual's use of the unique word.

In an embodiment, S230 may further include grouping and sorting the identified unique words. The unique words may be grouped so that instances of the same word are grouped together. These groupings may be sorted, for example, based on the number of occurrences of their respective words, based on the number of segments in which their respective words appear, and the like.

As a non-limiting example, a 100,000-word-long text sample authored by a single individual is divided into ten 10,000-word-long text segments. Unique words occurring exactly once in at least two of the text segments are listed as follows:

TABLE 1

| Unique words | A sample of unique words occurring in at least two text segments as hapax legomenon, i.e., with frequency 1 | | | | | | | | | | Word count |
|---|---|---|---|---|---|---|---|---|---|---|---|
| guys | 1 | 1 | 1 | 1 | 0 | 1 | 1 | 1 | 1 | 1 | 9 |
| cloud | 1 | 1 | 1 | 1 | 0 | 1 | 1 | 0 | 1 | 0 | 7 |
| groups | 0 | 1 | 1 | 1 | 1 | 0 | 1 | 1 | 1 | 0 | 7 |
| piled | 0 | 1 | 1 | 1 | 0 | 1 | 1 | 1 | 0 | 1 | 7 |
| moon | 0 | 1 | 1 | 1 | 1 | 1 | 0 | 0 | 1 | 1 | 7 |
| evenings | 0 | 0 | 1 | 1 | 1 | 1 | 0 | 1 | 1 | 1 | 7 |

As illustrated in Table 1, the unique words may be grouped by word (e.g., "guys" is one group, "cloud" is another, etc.), and the groups may be sorted based on the number of occurrences of their respective words.

At S240, neighboring words are identified for the unique word in one or more of the segments. The neighboring words for a unique word include all words within a vicinity of the unique word, where each vicinity of the unique word is within a threshold distance (e.g., within a threshold number of words or lines before or after the unique word) in one of the segments. In this regard, multiple sets of neighboring words may be identified, with each set of neighboring words including words within a vicinity of an occurrence of the unique word in each of the segments such that the vicinity is extracted for each occurrence of the unique word.

In a further embodiment, the vicinity for a given occurrence of a unique word includes words includes words that are at most three sentences away from the sentence including instance of the unique word, i.e., at most three sentences before or after the sentence including the occurrence of the unique word. In yet a further embodiment, the vicinity for a given occurrence of a unique word includes words that are at least one sentence away from the sentence including the unique word, i.e., at least one sentence before or after the sentence including the occurrence of the unique word.

At S250, a text-based data structure is modified based on the determined sentiment of the unique word in order to adapt the text-based data structure to the text sample. In an embodiment, modifying the text-based data structure includes inserting one or more instances of the unique word into respective locations within the text-based data structure and, more specifically, into locations associated with predetermined second sentiments matching the first sentiment of the unique word.

Figure 3:
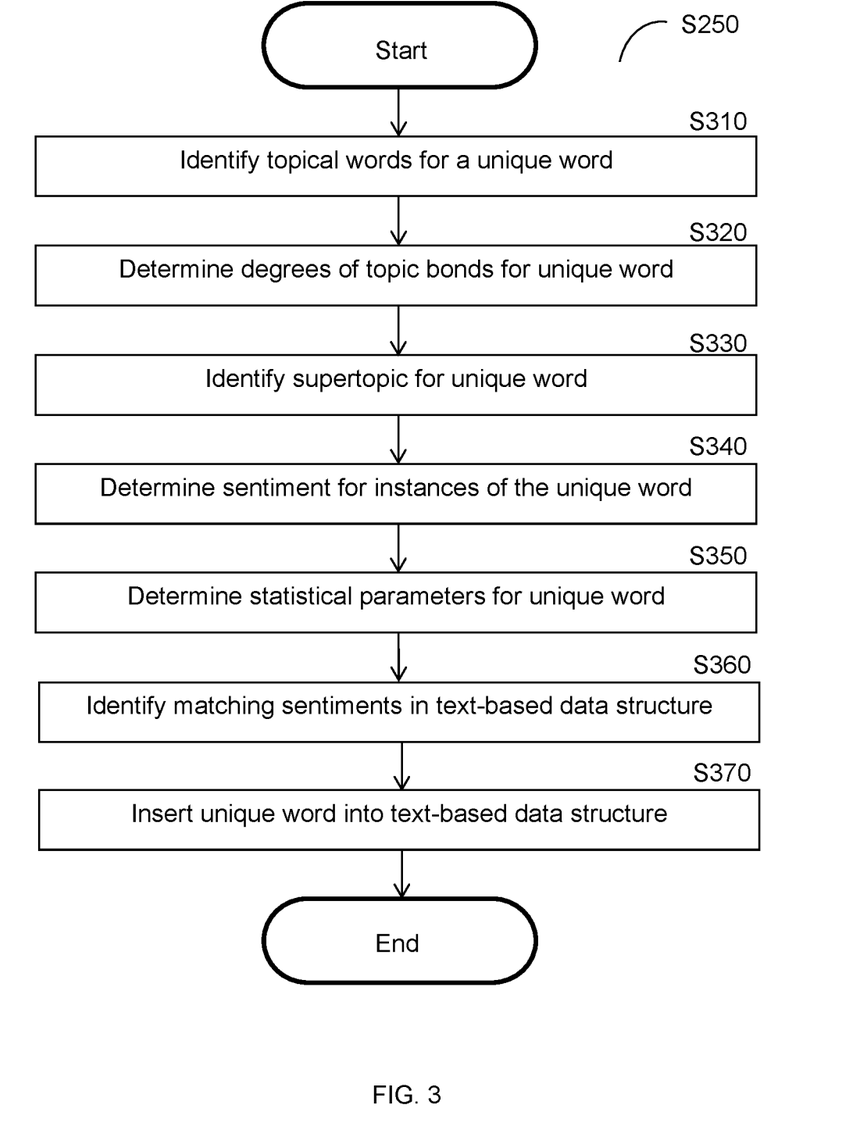
FIG. 3 is a flowchart illustrating a method for adapting a text skeleton to a text sample according to an embodiment.

In an embodiment, the text-based data structure is a text skeleton modified as discussed with respect to FIG. 3. The text skeleton is a structured dataset including one or more insertion locations which are predetermined designated locations for insertion of unique words. Non-limiting example text skeletons include an advertising or promotion text, such es email, ad banner on a website, blog post, commercial review, news, commentaries, and any other web page content.

Each insertion location of the text skeleton may be, but is not limited to, a blank space into which a unique word is to be inserted, a placeholder word to be replaced with a unique word (e.g., a synonym of the unique word), and the like. In a further embodiment, each insertion location has a predetermined association with a known sentiment, and the unique word is inserted into insertion locations with a matching sentiment. In other words, the unique word is determined to have a first sentiment and is inserted into insertion locations having a second sentiment which matches the first sentiment.

FIG. 3 is a flowchart S250 illustrating a method for adapting a text skeleton to a text sample according to an embodiment.

At S310, topical words are identified for a unique word that was identified within a text sample. The topical words include individual topical words or word groups including multiple topical words. Each topical word or topical word group for a unique word is a word or group occurring in multiple vicinities with respect to the unique word.

At S320, topic bonds and degrees of those topic bonds are determined for the unique word with respect to the identified topical words.

Each degree of topic bond for a unique word is a percentage of occurrences of a corresponding topic among vicinities of instances of the unique word within the text sample. Each topic is a word or set of words occurring in vicinities of two or more occurrences (i.e., instances) of the unique word within the text sample. As noted above, each vicinity includes words within a predetermined threshold distance (e.g., as defined with respect to a number of words, a number of sentences, etc.) of a respective instance of the unique word. Topics which are sets of words may be word groups which include a set of predetermined synonyms. To this end, in an embodiment, S320 includes identifying one or more topics among vicinities of instances of the unique word within the text sample.

As a non-limiting example, if a unique word occurs 18 times total among the segments and is identified within a vicinity containing a given topic (i.e., a topic represented by a predetermined word or a word from a predetermined word group) once in each of 3 segments and a total of 10 times in 2 other segments of the text sample, then the topic of the unique word is identified in 13 vicinities containing the given topic of the total 18 unique word vicinities. Thus, in such an example, the unique word has a topic bond of 72% (13/18=0.72) with respect to that topic.

As another non-limiting example, a 100,000 words-long text sample authored by a single individual is split into 10 text segments, which are analyzed with respect to vicinities of a unique word identified therein. Sets of words of respective topics contained in a number of vicinities of the unique word are listed as follows, where each number represents a number of vicinities containing one or more occurrences of a particular set of words.

TABLE 2

| Topic | Unique-word vicinities containing the topic |
| --- | --- |
| dust | 6 |
| left | 4 |

TABLE 2-continued

| Topic | Unique-word vicinities containing the topic |
| --- | --- |
| mind | 3 |
| dark | 3 |
| mad | 3 |
| american | 3 |

As shown in Table 2, instances of each topic may be found within the vicinity of 3 or more instances of the unique word. A degree of topic bond for each of the topics may be determined by dividing the respective numbers of unique word vicinities containing the topic as shown in Table 2 by a total number of occurrences of the unique word within the text sample.

At S330, a supertopic is identified for the unique word based on the topical words for the unique word. In an embodiment, the supertopic includes a topic which occurs in vicinities of two or more instances of unique words. In other words, the supertopic includes a word and/or a group of words occurring within vicinities for two or more instances of unique words, where each word or group of words is a topic which itself occurs within the vicinity of two or more instances of the unique word.

The supertopics are identified using a process for determining unique words with stable vicinities or otherwise demonstrating stable text behavior. The stable vicinity of unique words identifies the deep sentiment of an individual followingly (unconsciously recurring attitudes). The stable vicinity of unique words specifies the content used by an individual to address a different context in language use and defines the user's consciously or unconsciously preferred contents referred to as topics or supertopics, described as an individual's content profile. A stable topic reflects different mental processing of a word form by an individual and marks language phenomena used for text personalization, influencing an individual and his or her mind engineering.

Supertopic identification is facilitated by the fact that unique words have a direct impact on their vicinities. In case unique-word vicinities overlap, such conjunctions can be interpreted as text spots which possess a higher level of unconscious repetitions and topic compulsion. For the identification of an overlapping vicinities' topic, the topic extraction span extends, i.e., one chooses a wider vicinity. The scope of such identification is the sentence with the respective unique word and 5 sentences before and the 5 sentences after. In an embodiment, for the extraction of an overlapping vicinities' topic, only such segments of the vicinities of different unique words which overlap are taken into account.

In an embodiment, the supertopics are identified using a frequency list of words or groups of words, bi-grams, and tri-grams. In a further embodiment, the frequency list of words or groups of words, bi-grams, and tri-grams from vicinities of the unique word is prepared for the topic identification in one or more of the following manners.

In a first manner, a topic or supertopic relates to the unique word which defines the vicinity where the topic or supertopic appears, i.e., it is to be found in the vicinities of two or more occurrences of a single unique word (hereinafter the single topic; the list of such topics is referred to as topic list A). In this case, such a combination of the unique word form and the specific topics or supertopics (content and sentiment) may be applied in order to create a text fully personalized to the particular individual activating their sentiment in relation to the purpose of the demand.

In a second manner, the whole sum of all vicinities of all unique words is used for identification of the complete set of topics or supertopics (hereinafter the general topics; the list of such topics is referred to as topic list B). In this case, the word forms from all vicinities of all different unique words strengthen the significance of specific single topics occurring in the vicinities of different unique words. To determine individual topics, the frequency and relevance (according to a particular relevance measure) of word forms and word form n-grams occurring in unique-words' vicinities are used.

The topic may further be a word, group of words, bi-gram, or tri-gram with a frequency higher than 1 within the unique word vicinities (the single topic) or within all unique word vicinities (the general topic).

It is noted that vicinities of a given unique word may overlap (i.e., such that their respective sets of words overlap). In an embodiment, topics of overlapping vicinities are detected when vicinities overlap and mark the same word forms or word form n-grams. Topics of overlapping vicinities can emerge in the case of single topics as well as general topics. The relevance of a topic to a unique word may be increased as the topic appears within the vicinity of additional occurrences of the unique word. The words or sets of words representing overlapping vicinities' topics are, thus, presented in a list with their respective frequencies (referred to as topic list C), in a topic list with some frequencies multiplied (topic list D) and in a topic list with original frequencies (topic list E). Topic list D and E differ in frequencies. Topic list E differs from list B in frequencies and in the words or sets of words included. An increased vicinity of overlapping vicinities' topic take adds additional word forms to the list B. In topic list D, the number of overlapping vicinities is multiplied by the frequency of a particular word form and word form n-gram in overlapping vicinities and multiplied by 9.81 to amplify their impact by increasing the order of magnitude to the frequency numeral.

At S340, one or more sentiments are determined for the unique word. In an embodiment, S340 may include determining a sentiment for each instance of the unique word within the text sample. An aggregate sentiment for the unique word may be determined based on the sentiments determined for the instances of the unique word. More specifically, the sentiment may be determined based on the neighboring words within the various vicinities of occurrences of the unique word.

In an embodiment, a sentiment of each vicinity for the unique word may be determined by a sentiment analyzer using selected categories (e.g., positive, negative, etc.). The sentiment analyzer is configured to apply sentiment determination rules for the words within each vicinity of the unique word in order to determine a sentiment of each occurrence of the unique word. In some embodiments, a degree of the determined sentiment may also be determined. The degree of a sentiment may be expressed as a numerical value which represents the extent to which the words within the vicinity demonstrate a particular sentiment. The sentiment may be determined based on predetermined sentiment values associated with words among the neighboring words, predetermined combinations of collocated words among the neighboring words having known effects on sentiment, both, and the like.

In a further embodiment, an average sentiment value for each unique word may be determined by averaging the degrees of sentiments among different vicinities of the unique word. Table 3, shown below, illustrates a non-limiting example illustrating example average sentiment values for various unique words. In Table 3, the numerical values represent degrees of a positive sentiment for various unique words in a text sample.

TABLE 3

| Unique words | Unique-word vicinities positive sentiment determination using a sentiment analyzer |
| --- | --- |
| guys | 1.52 |
| cloud | 2.42 |
| groups | 1.76 |
| piled | 1.87 |
| moon | 1.49 |
| evenings | 2.21 |

At S350, statistical parameters are determined for the unique word. The determined statistical parameters may include, but are not limited to an average word distance between occurrences of the unique word (i.e., an average number of words between instances of the unique word), an average length of sentences including the unique word, an average sentiment of the unique word, a combination thereof, and the like.

At S360, matching sentiments within a text skeleton are identified with respect to the unique word. In an embodiment, S360 includes comparing predetermined sentiments of insertion locations within the text skeleton to the sentiment of the unique word. As noted above, the text skeleton is a text-based data structure including one or more insertion locations associated with predetermined sentiments.

At S370, the unique word is inserted into the text skeleton. In an embodiment, S270 includes inserting the unique word into one or more blank spaces of the text skeleton, replacing each of one or more placeholder words in the text skeleton with the unique word, or both. The unique word may be inserted into insertion locations (e.g., blank spaces or spaces having placeholder words) that are associated with sentiments matching a sentiment of the unique word, into insertion locations associated with predetermined words which are known synonyms of the unique word (e.g., a placeholder word mapped to the unique word in a predetermined synonym mapping), both, and the like. To this end, each insertion location in the text skeleton may be marked (e.g., using metadata) with a particular category of sentiment (e.g., positive, negative, sensory, social, affect, anxiety, etc.) to be matched against the sentiment of the unique word.

In some embodiments, S370 may further include modifying the unique word in order to match predetermined tenses, parts of speech, and the like, of the insertion locations and inserting the modified versions of the unique word into respective matching tense or part of speech insertion locations. As a non-limiting example, when the unique word is an adjective and a blank space insertion location has metadata indicating that an adverb should be inserted therein, a modified version of the unique word as an adverb is generated and inserted into the blank space.

Returning to FIG. 2, at S260, the modified text-based data structure is inserted into multimedia content (e.g., into a multimedia content item) in order to create customized multimedia content (e.g., a customized multimedia content item). In an embodiment, S260 includes inserting the unique word into one or more blank spaces of the text-based data structure, replacing one or more placeholder words in the text-based data structure with the unique word, or both.

At optional S270, a deep content visualization may be generated. The deep content visualization is a visual illustration of unique words used by an individual, and may be color-coded or otherwise visually distinguish the unique words from other words used by the individual. In some embodiments, the unique words illustrated in the deep content visualization may be listed in an order, for example, with respect to a number of times each word was used, a degree of a sentiment for the unique word, a degree of topic bond, and the like.

The deep content visualization is a visual illustration of the text sample that allows a user to rapidly perceive relevant portions of the text sample (e.g., portions containing the unique words, vicinities thereof, etc.). In some implementations, the deep content visualization may be or may include a word cloud. The sets of words and n-gram frequencies of words may be represented using different sizes of fonts for certain words, which may highlight their various significance. Color differentiation of particular word forms and word form n-grams enable the reader to distinguish them more easily. As a non-limiting example, words and sets of words belonging to a content umbrella (e.g., a predetermined group of words and/or sets of words) may be visually depicted in the same color, with the font sizes for those words and sets of words varying depending on their respective frequencies, relevance (e.g., as defined with respect to degrees of topic bonds to the unique word), and the like. Further, supertopics identified within single vicinities of the unique word or interconnected in multiple vicinities of the unique word may be further visually distinguished from other words.

In some embodiments, the platform used for the deep content visualization includes topic lists B and D discussed above, i.e., the general topic list (representing the stable context of unique words) and topic list with multiplied frequencies of an overlapping vicinities' topic. Words or sets of words and n-grams from the topic lists may be visualized with different font sizes (depending on their respective frequencies and relevance) and with different fonts and colors.

Accordingly, providing the deep content visualization to a user facilitates demonstration of the sensitive content (e.g., content of a potentially sensitive topic) within the text by an individual and provides an overview of the text narrative. As noted above, topics may be words or sets of words which are sensitive with respect to a unique word, and topics therefore appear within multiple vicinities of the unique word. A deep content visualization generated as described above therefore allows for highlighting the sensitive (i.e., manneristically repeated) content. Further, the deep content visualization may only require processing only a certain portion of the text sample (e.g., 40% or less of words in the text sample which includes the vicinities of the unique word) for sensitivity while effectively demonstrating sensitive content to the user.

At S280, the customized multimedia content is provided. Providing the customized multimedia content item may include, but is not limited to, sending the customized multimedia content item to a user device (e.g., the user device 120, FIG. 1), storing the customized multimedia content item in a database (e.g., one of the databases 140, FIG. 1) for subsequent access by a user device, displaying or otherwise projecting the customized multimedia content, combinations thereof, and the like. In an embodiment, S280 may alternatively or additionally include the generated deep content visualization.

The customized multimedia content is a human-perceivable output including at least a portion of the original multimedia content as well as of the adapted text-based data structure. The customized multimedia content may be in a form such as, but not limited to, an advertisement or a promotion campaign on a website, in a targeted email text, in an ad banner, pop-up windows, news, commentaries and any other web page content or it may be used by an electronic entity posing as a human, e.g. a chat bot, service bot, help bot in a chat window of a given website, or it may be expressed acoustically by using a text-to-speech module in an ad played to the user e.g., before playing a video on a website.

Accordingly, the customized multimedia content may be used for propagating messages that are more likely to resonate with the user who authored the text sample. When a sentiment of a unique word inserted into the text skeleton is positive, providing the customized multimedia content may serve to evoke a positive response from the user with respect to other portions of the text skeleton. When a sentiment of a unique word inserted into the text skeleton is negative, providing the customized multimedia content may serve to evoke a negative response from the user with respect to other portions of the text skeleton which may deter the user from performing one or more actions. As a non-limiting example, when a unique word having a negative sentiment is inserted into a text skeleton that also includes the words "smoking" and/or "cigarettes," the negative sentiment unique word may evoke a negative response of the user vis-à-vis the concept of smoking.

It should be noted that various techniques described herein are discussed with respect to adapting text skeletons and customizing multimedia content using a single unique word identified within a text structure, but that the disclosed embodiments can be extended to using multiple unique words without departing from the scope of the disclosure. Using a single unique word may allow for more efficient processing in many instances, and the techniques for identifying such a unique word allow for accurately customizing multimedia content without requiring identifying multiple words from the text sample to be used for customization, but customization can be further improved in at least some instances by utilizing additional unique words, for example, by inserting different unique words into respective portions of a text skeleton representing different sentiments.

It is noted that various disclosed embodiments may be utilized to provide customized multimedia content designed to avoid evoking a particular response from the user. To this end, in such an embodiment, unique words are identified in text samples and analyzed for criteria such as vicinities, contexts, and/or sentiments as described herein. Original multimedia content including text is obtained and analyzed for instances of the identified unique words. One or more instances of the unique words in the original multimedia content may be replaced with predetermined synonyms of those unique words, thereby creating a customized multimedia content that avoids evoking a particular response. For example, when a unique word is determined to have a particular sentiment which is to be avoided, instances of the unique word may be replaced in order to create the customized multimedia content.

Additionally, it is noted that certain techniques disclosed herein may be used in part to aid in linguistic analysis as a tool for psychoanalysis of an individual. Text authored or speech spoken by an individual may be monitored in order to obtain a text sample, and unique words may be identified within the text sample as described herein. Topics, sentiments, or both, of the identified unique words may be determined. The determined topics and/or sentiments may be utilized to generate a psychometric profile for the user. Various disclosed techniques provide improved efficiency processing that may allow for efficiently processing larger volumes of data, for example, when word usage of an individual is monitored continuously for extended periods of time.

Figure 4:
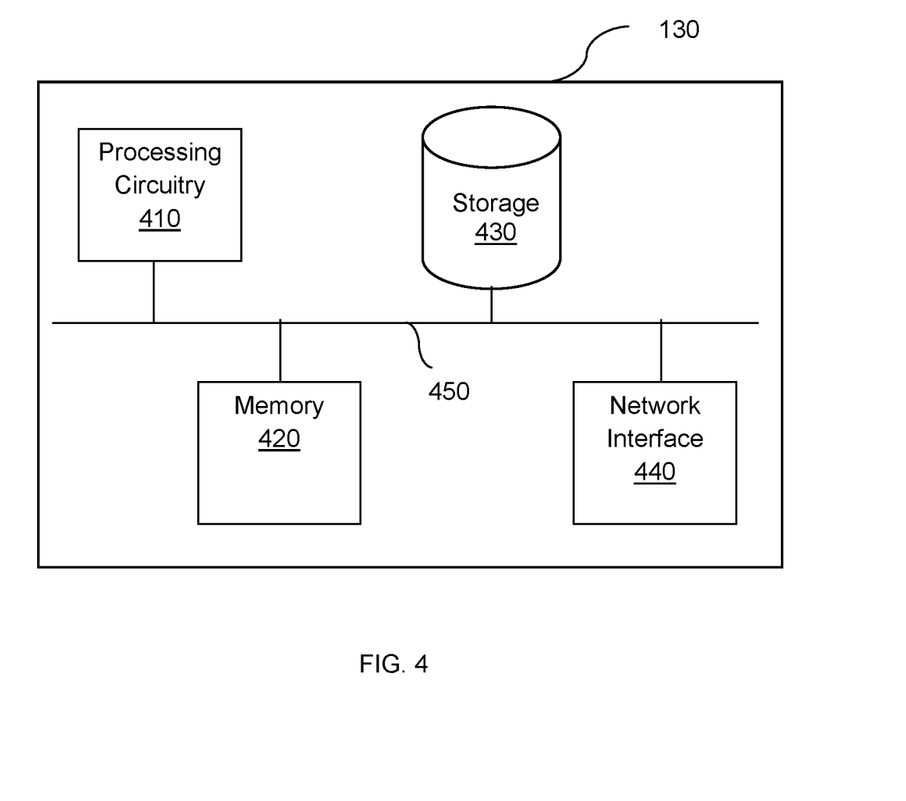
FIG. 4 is a schematic diagram of a customizer according to an embodiment.

FIG. 4 is an example schematic diagram of a customizer 130 according to an embodiment. The customizer 130 includes a processing circuitry 410 coupled to a memory 420, a storage 430, and a network interface 440. In an embodiment, the components of the customizer 130 may be communicatively connected via a bus 450.

The processing circuitry 410 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 420 may be volatile (e.g., random access memory, etc.), non-volatile (e.g., read only memory, flash memory, etc.), or a combination thereof.

In one configuration, software for implementing one or more embodiments disclosed herein may be stored in the storage 430. In another configuration, the memory 420 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 410, cause the processing circuitry 410 to perform the various processes described herein.

The storage 430 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 440 allows the customizer 130 to communicate with, for example, the user device 120, the databases 140, or both.

It should be understood that the embodiments described herein are not limited to the specific architecture illustrated in FIG. 4, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for customizing multimedia content using text-based data structures adapted to text samples, comprising:

dividing a text sample into a plurality of segments, each segment including a plurality of words, wherein an amount of words included in each of the plurality of segments has a maximum deviation of 10% from an amount of words included in each other segment of the plurality of segments;

identifying a unique word in the plurality of segments, wherein the unique word is a word occurring exactly once in each of at least two segments of the plurality of segments;

identifying a plurality of neighboring words within at least one vicinity of the unique word, wherein each vicinity of the unique word is a set of words within a threshold distance of the unique word in one of the plurality of segments;

determining a first sentiment of the unique word based on the plurality of neighboring words identified for the unique word and a plurality of predetermined numerical sentiment values for the plurality of neighboring words;

modifying a text skeleton based on the determined first sentiment, wherein the text skeleton is a structured dataset including an insertion location having a designated second sentiment, wherein modifying the text skeleton further comprises inserting the unique word into the insertion location in the structured dataset, wherein the first sentiment determined for the unique word matches the second sentiment designated for the insertion location in the structured dataset; and inserting the modified text skeleton into a multimedia content item in order to create a customized multimedia content item for the text sample.

2. The method of claim 1, wherein the location in the structured dataset is a blank space.

3. The method of claim 1, wherein the location in the structured dataset is a word associated with the second sentiment, further comprising:

replacing, with the unique word, the word associated with the second.

4. The method of claim 1, wherein the amount of words in each segment is between 2,000 and 10,000 words.

5. The method of claim 1, wherein each vicinity is within three sentences of an instance of the unique word in one of the plurality of segments.

6. The method of claim 1, further comprising:

determining at least one topical word for the unique word, wherein each topical word is a word having a plurality of instances among the plurality of neighboring words, wherein the sentiment of the unique word is determined based further on the at least one topical word.

7. The method of claim 6, wherein each topical word further has a plurality of instances within a respective vicinity of the at least one vicinity.

8. The method of claim 1, wherein each of the plurality of segments has the same amount of words as each other segment of the plurality of segments.

9. The method of claim 1, wherein the plurality of segments is authored by a single user.

10. A non-transitory computer readable medium having stored thereon instructions for causing a processing circuitry to execute a process, the process comprising:

dividing a text sample into a plurality of segments, each segment including a plurality of words, wherein an amount of words included in each of the plurality of segments has a maximum deviation of 10% from an amount of words included in each other segment of the plurality of segments;

identifying a unique word in the plurality of segments, wherein the unique word is a word occurring exactly once in each of at least two segments of the plurality of segments;

identifying a plurality of neighboring words within at least one vicinity of the unique word, wherein each vicinity of the unique word is a set of words within a threshold distance of the unique word in one of the plurality of segments;

determining a first sentiment of the unique word based on the plurality of neighboring words identified for the unique word and a plurality of predetermined numerical sentiment values for the plurality of neighboring words;

modifying a text skeleton based on the determined first sentiment, wherein the text skeleton is a structured dataset including a location having a designated second sentiment, wherein modifying the text skeleton further comprises inserting the unique word into the location in the structured dataset, wherein the first sentiment determined for the unique word matches the second sentiment designated for the location in the structured dataset; and inserting the modified text skeleton into a multimedia content item in order to create a customized multimedia content item for the text sample.

11. A system for customizing multimedia content using text-based data structures adapted to text samples, comprising:

a processing circuitry; and a memory, the memory containing instructions that, when executed by the processing circuitry, configure the system to:

divide a text sample into a plurality of segments, each segment including a plurality of words, wherein an amount of words included in each of the plurality of segments has a maximum deviation of 10% from an amount of words included in each other segment of the plurality of segments;

identify a unique word in the plurality of segments, wherein the unique word is a word occurring exactly once in each of at least two segments of the plurality of segments;

identify a plurality of neighboring words within at least one vicinity of the unique word, wherein each vicinity of the unique word is a set of words within a threshold distance of the unique word in one of the plurality of segments;

determine a first sentiment of the unique word based on the plurality of neighboring words identified for the unique word and a plurality of predetermined numerical sentiment values for the plurality of neighboring words;

modify a text skeleton based on the determined first sentiment, wherein the text skeleton is a structured dataset including a location having a designated second sentiment, wherein the system is further configured to insert the unique word into the location in the structured dataset, wherein the first sentiment determined for the unique word matches the second sentiment designated for the location in the structured dataset; and insert the modified text skeleton into a multimedia content item in order to create a customized multimedia content item for the text sample.

12. The system of claim 11, wherein the location in the structured dataset is a blank space.

13. The system of claim 11, wherein the location in the structured dataset is a word associated with the second sentiment, wherein the system is further configured to:

replace, with the unique word, the word associated with the second.

14. The system of claim 11, wherein the amount of words in each segment is between 2,000 and 10,000 words.

15. The system of claim 11, wherein each vicinity is within three sentences of an instance of the unique word in one of the plurality of segments.

16. The system of claim 11, wherein the system is further configured to:

determine at least one topical word for the unique word, wherein each topical word is a word having a plurality of instances among the plurality of neighboring words, wherein the sentiment of the unique word is determined based further on the at least one topical word.

17. The system of claim 16, wherein each topical word further has a plurality of instances within a respective vicinity of the at least one vicinity.

18. The system of claim 11, wherein each of the plurality of segments has the same amount of words as each other segment of the plurality of segments.

19. The system of claim 11, wherein the plurality of segments is authored by a single user.

* * * * *